United States Patent
Giles et al.

[11] Patent Number: 5,818,339
[45] Date of Patent: Oct. 6, 1998

[54] METHOD AND APPARATUS FOR DETECTING ICE AND PACKED SNOW

[75] Inventors: Donald Beverly Giles, R.R. #1, Waterford, Ontario, Canada, N0E 1Y0; David Russell Kemp, Waterford, Canada

[73] Assignee: Donald Beverly Giles, Waterford, Canada

[21] Appl. No.: 700,957

[22] Filed: Aug. 21, 1996

Related U.S. Application Data

[63] Continuation-in-part of Ser. No. 508,508, Jul. 28, 1995, abandoned.

[51] Int. Cl.⁶ .................................................. G08B 19/02
[52] U.S. Cl. ........................................ 340/583; 250/339.11
[58] Field of Search ................................... 340/583, 905; 356/369; 73/170.26; 250/339.11, 574

[56] References Cited

U.S. PATENT DOCUMENTS

| | | | |
|---|---|---|---|
| 3,634,753 | 1/1972 | Unterberger | 324/337 |
| 4,274,091 | 6/1981 | Decker | 340/583 |
| 4,690,553 | 9/1987 | Fukamizu et al. | 340/583 X |
| 4,803,470 | 2/1989 | Fineman | 340/583 |
| 5,225,827 | 7/1993 | Persson | 340/904 |
| 5,261,243 | 11/1993 | Dunsmore | 62/52.1 |
| 5,296,853 | 3/1994 | Federow et al. | 340/962 |
| 5,301,905 | 4/1994 | Blaha | 244/134 F |
| 5,313,189 | 5/1994 | Dodd et al. | 340/905 X |
| 5,313,202 | 5/1994 | Hansman, Jr. et al. | 340/962 |

FOREIGN PATENT DOCUMENTS

| | | | |
|---|---|---|---|
| 15532 | 1/1985 | Japan | 356/369 |
| 175641 | 6/1992 | Japan | 356/369 |
| 282791 | 7/1994 | Japan | 340/905 |

*Primary Examiner*—Thomas J. Mullen, Jr.
*Attorney, Agent, or Firm*—Bereskin & Parr

[57] ABSTRACT

An apparatus for detecting the presence of ice or smooth packed snow on a road surface has a source of electromagnetic radiation, for example, a light emitting diode. This is mounted to illuminate an area of the road surface. It is driven by a modulating circuit at a known frequency. A detector is mounted adjacent the light source to receive radiation reflected back from the road surface, to generate a detector signal. This signal is demodulated by a demodulator to generate an intermediate signal. This is preferably compared with a fixed value, to determine whether the reflectivity of the road surface exceeds a set value, indicative of the presence of ice.

21 Claims, 4 Drawing Sheets ns. 5,818,339

METHOD AND APPARATUS FOR DETECTING ICE AND PACKED SNOW

CROSS-REFERENCE TO RELATED APPLICATION

This application is a Continuation-in-Part of our earlier application Ser. No. 08/508,508 filed Jul. 28, 1995, which is abandoned.

FIELD OF THE INVENTION

This invention relates to a method and apparatus for detecting ice and/or packed snow, and more particularly is concerned with the detection of ice and/or packed snow on road surfaces from a moving vehicle, so as to provide a warning of potentially hazardous road conditions.

BACKGROUND OF THE INVENTION

Ice build up on roads can occur in a variety of different weather conditions. It can result from simple freezing of a previously wetted road surface. Fallen snow can be compacted by vehicles to give an icy surface. Frequently, an overnight frost can leave a fine, icy film. In many cases, such icy conditions are readily visible and apparent to a driver, so that due allowance can be made for them. Often, the conditions are also consistent and uniform over an extensive area, so that a driver does not have to allow for varying ice conditions.

However, often ice is formed in a manner that is not apparent to a driver. In particular, where a thin film of ice is formed on a road surface, it can form so-called "black ice". Black ice is not readily visible or apparent and often is not readily detectible by someone travelling at speed in a vehicle. What can be even more dangerous is the presence of black ice that is patchy or intermittent. Thus, someone can be driving along a road which is apparently dry and clear, and can suddenly and unknowingly encounter a patch of black ice. In many cases, this will cause loss of control of the vehicle and an accident.

There have been proposals in the art for devices for detecting ice. Thus, U.S. Pat. No. 4,690,553, assigned to Omron Tateisi Electronics Co. proposes a road surface condition detection system. This however, is a fixed system, and relies upon projecting light at an acute angle to a surface, and then detecting both reflected and scattered light.

Another system is disclosed in U.S. Pat. No. 4,274,091 (Decker). This proposes both a method and apparatus for detecting the presence of ice from a vehicle. It provides an infrared light source and a detector. To generate pulses, it provides an optical chopper wheel. This system is somewhat complex, and relies upon interleaving light pulses and reference light pulses. Measuring light pulses comprise frequencies in at least one absorption band for ice and the reference light pulses comprise frequencies outside the absorption bands of ice. The provision of a chopper wheel necessarily means that the frequency obtainable for the pulse rate is low.

The present inventors have discovered that there are numerous sources of interference for any such optical system for detecting ice. Thus, for many frequencies, particularly for visible light, ordinary sunlight can provide a substantially constant signal, which clearly can be interrupted at regular intervals, to interfere with a received signal. Street lamps operating at 60 Hz can provide an interfering signal at a frequency of 120 Hz. Headlights from other vehicles, e.g. vehicles travelling in the opposite direction, can also provide an irregular DC interference source.

A further significant source of interference is what could be termed road noise. Thus, an ordinary road surface is typically formed from tarmac including individual pebbles or stones. Due to the irregularity of this surface, where it is just a thin film of ice, such a surface can generate noise interfering with any measurement, typically in the range up to 4.2 kHz. It should also be borne in mind that the frequency of any "road noise" caused by the individual stones or pebbles in a road will depend upon the speed of the vehicle. Thus, ¼ in. pebbles at 60 miles/hr is approximately equivalent to a frequency of 4.2 kHz.

It is often desirable to detect conditions where there is just a thin film of ice. Due to the effects given above, such a thin film of ice can be difficult to detect. Thicker layers of ice are often easier to detect, because they provide a smoother, more uniform surface. In any event, thicker layers of ice may be more apparent to a naked eye, and it is the detection on thin layers of ice or black ice which is more critical.

The Omron patent uses PbS or PbSe photoelectric sensors. These have a slow response time and will not operate over several hundred cycles per second. As this is a static installation, the problems of interference at various frequencies does not arise as in the present invention.

SUMMARY OF THE PRESENT INVENTION

Accordingly, for drivers of vehicles it is desirable to provide some means of detecting icy road surface conditions. In particular, it is desirable to be able to detect patchy and varying road surface conditions, so that allowance can be made for these. More particularly, there is a need for apparatus that can give adequate and reliable detection of icy conditions, even in the presence of numerous sources of interference such as an irregular road surface or fluctuating ambient lighting.

In accordance with the present invention, there is provided an apparatus for detecting the presence of ice or smooth packed snow on a road surface, the apparatus comprising: a source of electromagnetic radiation for illuminating an area of the road surface; a modulating circuit connected to the source for modulating the radiation provided by the source, and the modulating circuit including means for generating a constant frequency drive signal at a frequency of at least 2 kHz, and the source is driven by the constant frequency drive signal to provide pulses at said constant frequency; a detector for receiving radiation reflected back from the area of the road surface, to generate a detector signal; and a detection circuit connected to the detector for demodulating the detector signal, to generate an intermediate signal indicative of the reflectivity of the illuminated area, thereby indicating the presence of ice or smooth packed snow, the detection circuit comprising a filtering circuit for filtering out frequencies above and below the constant frequency, an intermediate amplifier connected to the output of the filtering circuit, a rectifying network means connected to the output of the intermediate amplifier, for generating a DC signal as an intermediate signal, and a comparator connected to the output of the rectifying network and having an input for a fixed level, the output of the comparator being an output signal indicative of the detected reflectivity. Depending on the use, expected speeds etc., the critical minimum frequency can be varied. Thus, a minimum frequency of 5, 6 or 7 kHz may be applicable for different applications.

Thus, an important aspect of the present invention is to provide pulses at a certain frequency, which is selected to be high enough to avoid interference from any potential noise sources. The inventors have found that, for most practical purposes, a lower limit of approximately 8 kHz is required.

It is preferred to use infrared radiation with a wave length of 900 nm. There are a number of advantages to this wave length. This wave length is attenuated strongly by the atmosphere and even more so by moist air, so that any such radiation from the sun is absorbed, and does not present the interference problem that visible light frequencies present. The Omron U.S. Patent mentioned above utilizes a wave length of 1200 nm. This apparently gives less reflectance, at the angles used, but it is attenuated more by atmospheric moisture. Thus, the Omron proposal uses a wave length where the reflectance of snow is less than the reflectance of the road surface. With the present invention, a frequency is selected where a reflectance of compact or wet snow is greater than the reflectance of the road surface, for radiation shone directly at the surface. Accordingly, the 900 nm wave length is preferred.

The selected wave length has proven to be effective both during the day and when it is dark. It is unaffected by sunlight.

A further aspect of the present invention is that the apparatus can be adjusted to detect hydroplaning conditions. Since a film of water is highly reflective, this requires turning the sensitivity down significantly. When so adjusted, the infrared wave length chosen has the further advantage that it does not pick up white or yellow lines painted on the road, as can happen if a visible light frequency is chosen. It may still give a false positive reading as a result of reflection from railway tracks and metal expansion joints on bridges, but these would only be intermittent, and not likely to be seriously misleading to a user.

Unlike the proposal in the Omron patent, it has been found that reflectance, as apposed to scattering, is a much more reliable technique for detecting ice. A scattered signal can vary enormously between clear ice and rime ice, and hence is unreliable.

In accordance with a further aspect of the present invention, the apparatus is preferably mounted on a vehicle ahead of the road wheels thereof, so as to eliminate or at least reduce interference due to water and debris thrown up by the wheels. In such an apparatus, the modulating circuit can have any suitable frequency, and, for certain applications may have a frequency below 8 kHz.

While packed snow can include dirt and mud or sand put down to aid traction, such packed snow is not such a concern. In general, if it contains sufficient opaque solid material not to be reflective, then it will not be slippery and it is not critical to detect it.

Preferably, the modulating circuit includes means for generating a constant frequency drive signal, and the source is driven by the constant frequency drive signal to provide pulses at said constant frequency, and the detection circuit includes a filtering circuit for filtering out frequencies above and below the constant frequency.

More preferably, the detection circuit includes an intermediate amplifier connected to the output of the filtering circuit, and a rectifying network connected to the output of the intermediate amplifier, for generating a DC signal as the intermediate signal, and the detection circuit includes a comparator connected to the output of the rectifying network and having an input for a fixed level, the output of the comparator being an output signal indicative of the detected reflectivity.

Preferably, to adjust the detection level, the detection circuit includes a level adjustment potentiometer, mounted for adjusting the level of the intermediate signal.

Advantageously, the output of the comparator is connected to a warning device for providing a warning to a user, when reflectivity in excess of a set value is detected, indicative of the presence of ice.

In accordance with another aspect of the present invention, there is provided a method of detecting the presence of ice or smooth packed snow on a road surface, the method comprising the steps of:

(1) providing a sensor assembly, including illumination and detection means mounted on a wheeled vehicle ahead of the wheels thereof so as to examine a surface before disturbance by the wheels, and an indicator assembly within an occupant compartment of the vehicle including indicating means for indicating the condition of a surface on which the vehicle is travelling;

(2) illuminating an area of a road surface with electromagnetic radiation from the illumination means which is pulsed at a frequency of at least 2 kHz;

(3) detecting radiation reflecting back from the illuminated area of the road surface, to generate a detection signal; and (4) demodulating the detected signal at the known frequency of the radiation source, to filter out unwanted signals, to generate an intermediate signal indicative of the reflectivity of the road surface, thereby indicating the presence of ice or smooth packed snow.

Preferably, to eliminate sources of noise and interference, the fixed or known frequency is in the range of 2 kHz to 200 kHz. It is preferred to use higher frequencies in excess of 5 kHz, or more preferably 8 Hz, to eliminate noise and interference from 60 Hz power sources. The electromagnetic radiation can comprise either red light or infrared radiation. It may be provided by an LED (Light Emitting Diode) with a focussing lens, or by a semiconductor laser.

BRIEF DESCRIPTION OF THE DRAWING FIGURES

For a better understanding of the present invention and to show more clearly how it may be carried into effect, reference will now be made, by way of example, to the accompanying drawings, which show a preferred embodiment of the present invention and in which.

DESCRIPTION OF PREFERRED EMBODIMENT

Figure 1:
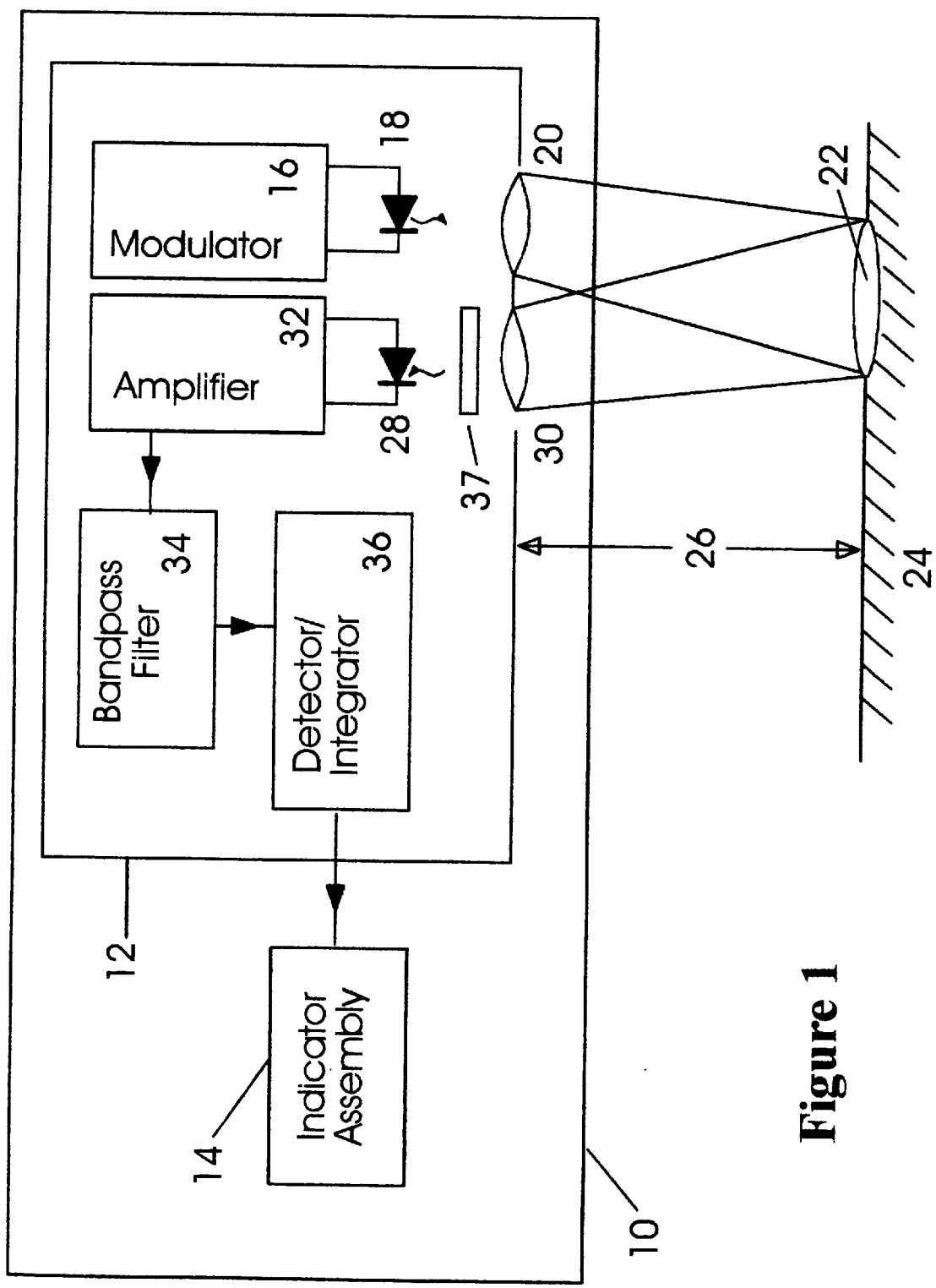
FIG. 1 is a schematic view of an apparatus in accordance with a first embodiment of the present invention.

Referring first to FIG. 1, the apparatus as a whole is indicated by the reference 10. The apparatus 10 includes a detector assembly 12 and an indicator assembly 14.

The detector assembly 12 includes a modulator or modulating circuit 16 driving a high output red or infrared light emitting diode (LED) 18, as a source of electromagnetic radiation. A lens 20 focuses the output of the LED 18. This gives a lighted area indicated at 22 on the road surface 24. The apparatus 10 would be mounted to a vehicle such that the distance 26 between the lens and the road surface would be approximately 16 inches. Clearly, in use, due to characteristics of a vehicle suspension, this distance 26 can vary.

Due to the small separation between the lens 20 and another lens 30 for receiving returned light, this separation 26 can vary between, for example, 12–20-inches, with little effect on the operation of the apparatus.

Corresponding to the LED 18, there is a photodetector diode or transistor 28, which receives light through the lens 30 which focuses reflected light from the lighted area 22. An optical filter 37 is provided to reject light other than the wavelength of interest.

The photodetector 28 is connected to an amplifier 32. The amplifier 32 is in turn connected through a band pass filter 34 to a detector 36. The output of the detector 36 is connected to the indicator assembly 14. The elements 32, 34, 36 and 14 form a detection circuit.

Figure 2:
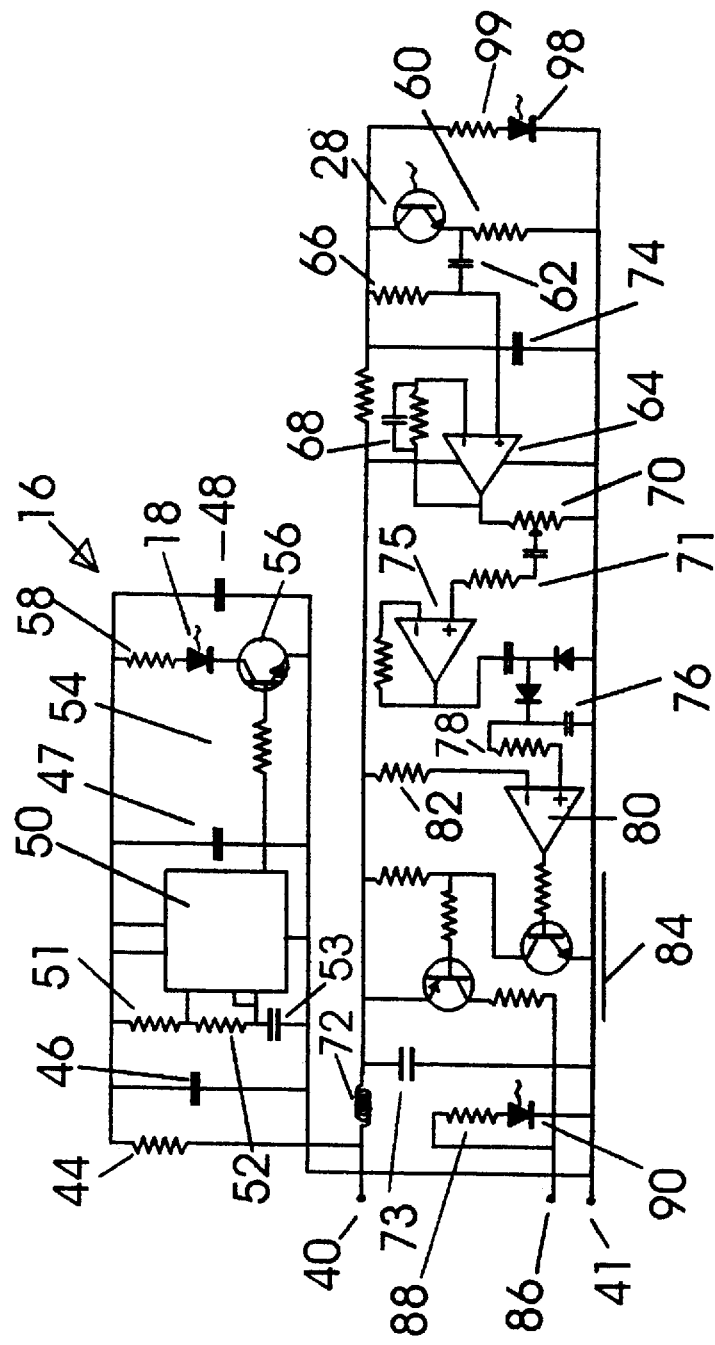
FIG. 2 is a circuit diagram of the apparatus of FIG. 1.

Referring now to FIG. 2, the detailed circuit for implementing the apparatus 10 is shown. This circuit essentially comprises the detector assembly 12 of FIG. 1.

The circuit includes an input 40 with a ground connection at 41 as power lines for a conventional 12 volt DC supply. The modulation circuit 16 is shown at the top of FIG. 2. The DC connection is through a resistor 44 and capacitors 46, 47 and 48 are provided to smooth the DC supply and reject any unwanted alternating components.

An integrated circuit LM555 is provided to provide a multivibrator, this being indicated at 50. Resistors 51 and 52 and a capacitor 53 are connected in series, and provide connections to a trigger terminal (7) and threshold and discharge terminals (2,6). Terminals (8,4), for power and reset are connected to the 12 volt line, and the terminal (1) is connected to ground. The output terminal (3) is connected via a 4K resistor 54 to a current buffering transistor 56. The transistor is connected in series with the LED 18 and a resistor 58. The transistor 56 acts as a current buffer for driving the LED 18.

It will be appreciated that the circuit LM555 is configured as an astable multivibrator. Here, the surrounding elements are chosen with values so as to give a constant frequency of 8 kHz. Thus, the LED 18 will provide a series of pulses at 8 kHz.

To smooth the DC supply, and ensure isolation of the modulation circuit 16 from the detection circuit, an inductor 72, and capacitors 73, 74 are provided, in known manner.

The photodetector transistor 28 is connected by a resistor 60 between the 12v line and the ground line. It's output is also connected by a capacitor 62 to the positive input of a filtering operational amplifier 64. A resistor 66 provides a further connection to the positive input from the positive DC line. The capacitor 62 serves to reject lower frequencies and only permit higher frequencies to pass to the operational amplifier 64.

A bias light assembly, comprising a resistor 99 and light emitting diode 98, is provided. It reduces variations in light levels between night and day operation to ensure the detector is running in a linear mode.

Feedback from the output of the operational amplifier 64 is provided to its negative input, and includes a resistor and capacitor 68 in parallel. As is known, this arrangement will provide a high degree of frequency selectivity so that only frequencies around the desired frequency of 8 kHz will be amplified.

A variable potentiometer 70 connected between the output of the amplifier 64 and ground provides variable sensitivity or adjustment for the apparatus. Its output is connected through a capacitor and resistor indicated at 71 to an intermediate operational amplifier 75, with simple resistance feedback to its negative input. This op. amp. 75 acts as a buffer. Its output is connected through a diode and capacitor rectifying network indicated at 76. This network 76 serves to generate an output DC signal whose value is proportional to the magnitude of the AC waveform received from the amplifier 75. This rectifying network also has an integrating effect. This filters out short transitory signals, e.g. from rail road tracks, road markings, etc. Choice of appropriate values can ensure that any sizable area of ice is detected.

This DC signal is connected through resistor 78 to the positive input of a comparison operational amplifier 80 whose negative input is connected through a resistor 82 to the positive DC line. The comparator amplifier 80 serves to compare the DC signal generated with a fixed level.

The output of the comparator 80 is then connected through a pair of transistors and associated resistors, indicated at 84, configured as a power amplifier. This provides an output at 86 for the detected voltage. This output 86 is connected through a resistor 88 and a LED 90, to provide an indication of the magnitude of the sensed signal.

In use, the modulation circuit 16 will drive the diode 18 to provide light pulses at 8 kHz. These are focused on the road to provide the lighted area of 22. The reflections are picked up by the photo transistor 28. The detection circuit, in particular the configuration of the operational amplifier 64 and capacitor 62 serve to select the corresponding 8 kHz signal. This serves to discriminate between reflected signal from the light source 18 and various forms of light interference. The modulation frequency is chosen to be higher than the light interference caused by expected sources such as street lamps and sunlight on the road surface. It has been discovered that usual variations in road surface together with combined vehicle speed can produce noise components up to a few kilohertz. Current testing indicates that modulation frequencies from 2 kHz to 200 kHz will provide the necessary isolation.

After amplification by the amplifier 64, the potentiometer 70 enables the desired detection level to be set.

The signal is then rectified in the network 76, compared with the set level in the comparator 80 and then amplified by the power transistors 84.

If the detected signal exceeds the threshold as determined by the comparator 80 then a positive signal will be present at the output 86, turning on the LED 90. This LED 90 is mounted as part of an operating panel of the device which would be located on or adjacent the dashboard of a vehicle, or otherwise clearly visible to the user.

The power transistors 84 are provided so that a significant current e.g. 0.5 amps, can be drawn from the output 86. For example, this can be connected to a conventional incandescent lamp or to some sort of audible warning device.

Tests of this device have shown that it is effective and selective in detecting ice. For test purposes, an apparatus similar to that shown was used but the output from the operational amplifier 64 was monitored. In other words, the output was measured, without comparison to some fixed level. Where a comparator is present, one essentially has a digital output that either gives a fixed level or no output. By monitoring the signal level earlier in the detection section, one obtains a better indication as to the effectiveness of the detection.

On dry and wet asphalt and pavement, a zero reading was obtained. On smooth, shiny compressed snow which is moderately slippery, a reading of 3–5 was obtained. On rough ice or sharp pebbly ice, which one can see and on which some traction does exist, again an effectively zero reading was obtained. More importantly, on black ice, a reading of 10 was given (it will be appreciated that all these readings are relative to one another and the absolute value is not critical). When the ice had a thin film of water over it, an even higher reading was obtained. Ice with a significant layer of water, i.e. puddles, gave a poor result. The water tends to be ruffled by passage of the vehicle and give a low reading.

It was also found that, prior to obtaining a consistent reading when the black ice was present, a light would be flashing or flickering in advance, or the meter would give occasional high readings indicating small patches of black ice or the presence of black ice. This is extremely useful. When a driver begins to see occasional flashing indicating very small patches of black ice, then he or she knows to slow down, since there may be larger and more dangerous patches of ice ahead.

Figure 3:
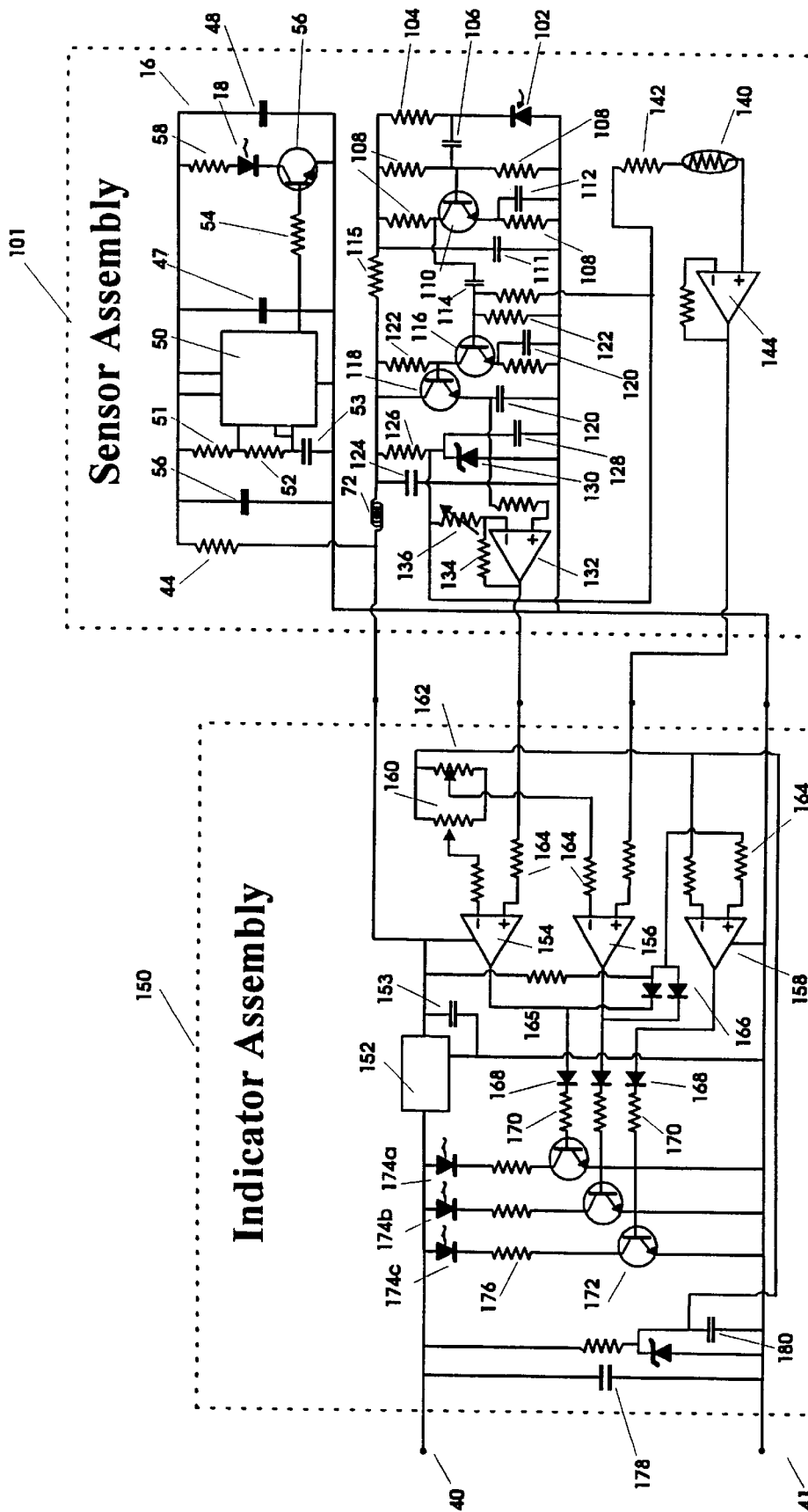
FIG. 3 is a circuit diagram of a second embodiment of an apparatus in accordance with the present invention.

Reference will now be made to FIG. 3 which shows a second embodiment of the present invention. For simplicity and brevity, like components are given the same reference numeral and their description is not repeated.

This second embodiment has a sensor assembly 101 and an indicator assembly 150. The input 40 and ground connection 41 are connected to both these two assemblies. In all embodiments, it is anticipated that these lines 40, 41 would be connected to the conventional power supply of a vehicle, and hence the potential at line 40 may fluctuate between 12 and 17 volts. At least for this embodiment, it has been discovered that it is important to have a fairly stable voltage level. For this reason, a 10 volt voltage regulator 152 is provided, to provide a stable supply to the amplification and other elements.

In this embodiment, the diode 18 is an infrared diode emitting light with a wave length of 900 nm. The multivibrator 50 is set up so as to produce a frequency of 100 kHz, so that the diode 18 provides pulses at that frequency.

To accommodate this higher frequency, in the detector part of the circuit, a photodiode 102 is provided. It is biased by a resistor 104, to form an IR receiver connected by a capacitor 106 through to an amplifier transistor 110. In known manner, the transistor 110 has a biassing network of resistors 108 around it. A capacitor 112 is connected between ground and the emitter of the transistor to filter out high frequency components, i.e. so the transistor 110 acts as a band pass filter. Additionally, a resistor 115, in the supply line to the transistor 110 and photo diode 102, and a capacitor 111 across the supply lines serve to smooth out the supply.

A capacitor 114 connects the output of the transistor 110 to amplifying transistors 116, 118. In known manner, this includes appropriate biassing resistors 122 and capacitors 120 again serving to filter out unwanted high frequency components. The transistor 116 operates as a further band pass filter and transistor 118 acts as a peak envelope detector.

The capacitor 114 is connected through to the amplifying transistor 116 through a junction between a pair of resistors 122. These resistors connect a voltage reference, indicated at VREF through to ground, and hence serve to bias the input of the transistors 116, 118.

The output of the amplifying transistor 118 is connected to the positive input of an operational amplifier 132, which forms part of the peak envelope detector. This amplifier 132, like all the operational amplifiers in the different embodiments, is a current input amplifier, i.e. it provides a virtual ground at its inputs. This has a conventional feedback resistor between its output and a negative input. It also has a variable potentiometer 136 connected between the VREF voltage source and its negative input.

A resistor 126 and a parallel arrangement of a zener diode 130 and capacitor 128 provide a connection between the lines 40, 41, to generate the VREF voltage as indicated.

As at other points in the circuit, a capacitor 124 is provided to smooth out fluctuations in the power supply.

Now, an important aspect of this second embodiment is the provision of a thermistor 140 to detect temperature and to provide an indication to the user of the external temperature. This thermistor 140 would be mounted at some suitable external location, typically with the light emitting diode 18 and photodiode 102. The voltage source VREF is connected through a resistor 142 and the thermistor 140 to the input of a buffer amplifier 144. The voltage at the buffer amplifier 144 output will depend upon the resistance of the thermistor 140, and hence is indicative of temperature. The resistance of the thermistor 140 falls, as the temperature falls.

Turning now to the indicator assembly 150, this includes three operational amplifiers 154, 156 and 158, which are provided with appropriate resistors 164.

The output of the operational amplifier 132 is an analog signal representative of the detected signal level, with the high frequency signal filtered out. It provides a clipping function, so that low level signals, i.e. for very low reflectance, can be clipped. This output is connected through to the positive input of an icing operational amplifier 154. The output of the buffer amplifier 144 is connected through to the positive input of a temperature operational amplifier 156. Both these operational amplifiers 154, 156 have negative inputs connected through potentiometer 160, 162 to a second voltage reference, VREF2. The potentiometer 160 enables the reflectivity sensitivity to be adjusted. It can be adjusted to detect oil/water or ice/snow. The potentiometer 162 enables a set or critical temperature to be adjusted, and typically will be set between 0° C. and 5° C. The operational amplifier 158 has a negative input connected by a resistor 159 to the second voltage reference VREF2.

The output of each of the operational amplifiers 154, 156, 158 is connected by a respective diode 168 and resistor 170 to the base of a respective transistor 172. Each of the three transistors 172 is connected in a series with a light emitting diode 174a, b or c and resistor 176. Thus, the output of each of the amplifiers 154, 156, 158 has the effect of turning on the corresponding transistor 172, and hence turning on the respective light emitting diode 174a, b or c. As detailed below, each light emitting diode 174a, b or c can be provided with appropriate colours and located to provide an indication to a user. The three light emitting diodes (LEDs) are identified as 174a, 174b, 174c.

When a sufficiently strong signal is detected by the photo diode 102, this turns on the amplifier 132, as determined by the sensitivity of the setting of potentiometer 136. This in turn turns on the amplifier 154, and again this would depend upon the setting of the potentiometer 160. With amplifier 154 turned on, this turns on the first LED 174a. This indicates that a reflective road condition has been detected. Whether this is indicative of ice or not will depend upon the ambient temperature. In other words, if the temperature is below freezing, it is assumed that this is indicative of ice, packed snow etc, whereas if the temperature is above freezing it is assumed that this is indicative of water etc., which may indicate hydroplaning conditions. Operation of the second amplifier 156 depends upon the temperature detected by the thermistor 140. As the thermistor has a positive temperature coefficient, its resistance decreases with decreasing temperature. This results in the output from the buffer amplifier 144 going up as the temperature drops. At a certain point, this increase in output will cause the output of the op amp 156 to go sufficiently high to turn the corresponding transistor 172 on and hence turn on the LED 174*b*. The exact temperature at which the LED 174*b* comes on is set by adjusting the potentiometer 162. Thus, depending upon the usage, the user may want to vary this threshold slightly about the freezing mark.

Once the LED 174*b* is lit, then the LED 174*a* can be turned on and off, in dependence upon the signal sensed by the photodiode 102 as before.

While a user can read the two LEDs 174*a*, 174*b*, together, an additional warning is provided in the case of freezing conditions. In other words, when freezing conditions are present, it is desirable to provide an additional indication over and above that provided by the LED 174*a* of possible slippery or icy conditions.

For this purpose, the additional LED 174*c* is provided. It is controlled by the operational amplifier 158. The positive input of this amplifier is connected by one of the resistors 164 and a further resistor 165 to the positive voltage line 40. The junction between the resistors 164, 165 is connected by a pair of diodes 166 to the outputs of the two op amps 154, 156.

When the op amps 154, 156 are not turned on, then their outputs are at ground potential and the diodes 166 effectively drain current from the resistor 165, keeping the positive input to the operational amplifier 158 low, so that it is turned off.

However, once both the LEDs 174*a*, 174*b* are turned on, i.e. when both the op amps 154, 156 are turned on, then this drain is effectively turned off. Then, the positive input to the operational amplifier 158 goes high, turning on the operational amplifier, and hence turning on the transistor 172 associated with the LED 174*c*. Then, all three LEDs 174*a, b*, and *c* are lit, giving an indication both that a reflective condition has been found and that the temperature is below freezing, indicative that the reflective surface is likely an icy surface. The LEDs 174*a, c* could be red and the LED 174*b*, for temperature, could be a different colour, e.g. green.

Finally, the second voltage reference VREF2 is derived from the circuit 180. This has a resistor and zener diode in series as known, with a voltage reference being taken from the junction between these two elements. A capacitor is provided, in known manner, to smooth out A.C. components. A further capacitor 178 is provided to further smooth out the main power supply. A capacitor 153 is provided around the 10 volt regulator 152, for the same reason.

It has been found that this version of the device can give an indication both of icing conditions and also of potential hydroplaning conditions. Thus, where there is a significant film of water on the road, i.e. more than a mere wet surface, this can be detected. Hence the temperature indication at 174*b* is provided, so that the user may know whether the device is indicating icing conditions or merely a significant layer of water. It has been found that it will detect relatively smooth water but, if the water surface is ruffled in any way, e.g. because of heavy rain or due to motion of the vehicle, then it may not be detected. It has also been found that the device is useful for detecting conditions where the road surface is wet and there is a certain oil film, as can happen after a long, dry spell.

It has also been found that the detector can be adjusted, either to detect road markings, such as white and yellow lines, or to reject them, as desired. Some users might find this useful for providing a warning on long highway journeys, to indicate that a vehicle is straying out of its lane.

Figure 4A:
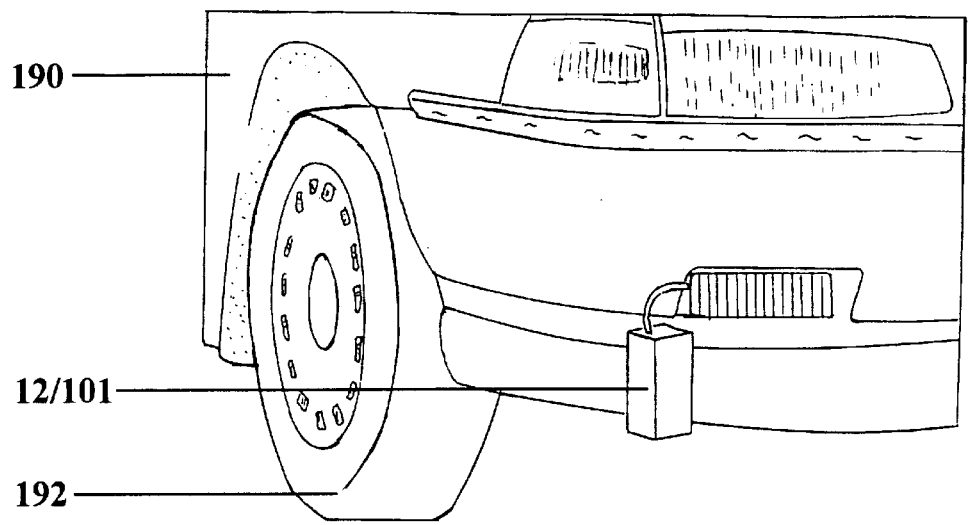
FIGS. 4a and 4b are side and front views showing mounting of the apparatus at the front of a motor vehicle.
Figure 4B:
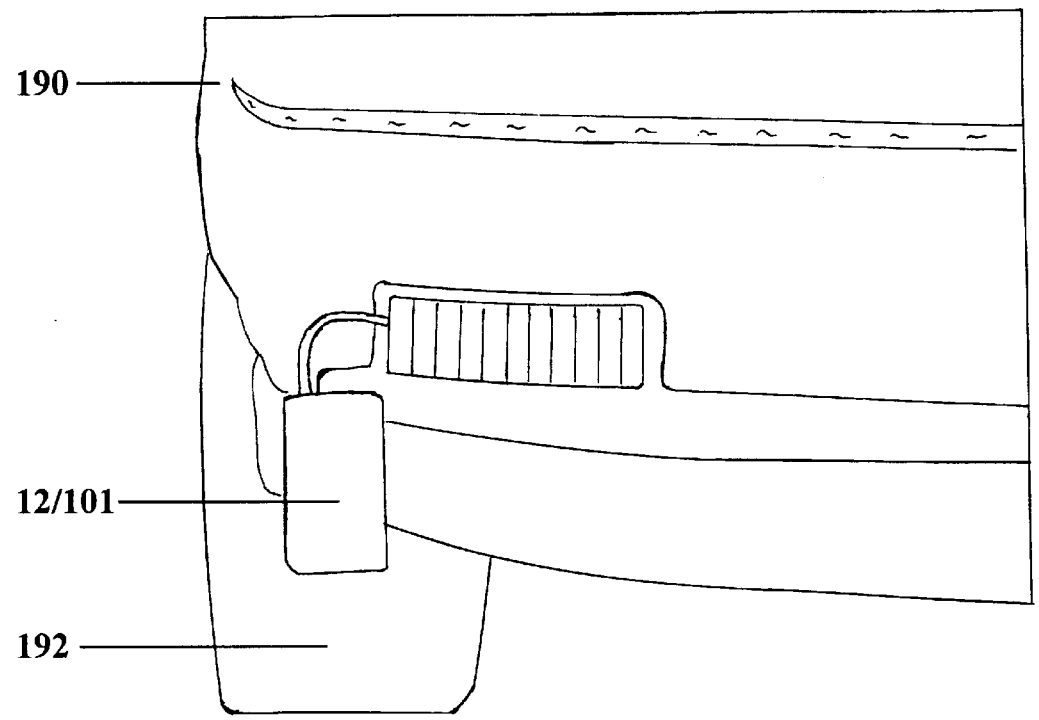

Reference will now be made to FIGS. 4*a* and 4*b*, which show mounting of the apparatus on a vehicle, here a car 190. The Figures show the right forward wheel 192 of the car. The drawings show a detector/sensor assembly 12 or 101, and it will be appreciated that the indicator assembly 14 or 150 would be mounted within the vehicle and is not shown in these figures.

The sensor assembly is mounted immediately below a front bumper, and here is shown so as to be spaced 20 in. in front of the wheel and 12 in. from the ground.

It is anticipated that it would be preferable to mount the sensor assembly behind the bumper, but in any event, it should be mounted away from the wheel well, as there is frequently much water and debris circulating within the wheel well, which could cause interference.

It is preferred to mount the detector or sensor assembly at the front of the car on the right, where vehicles travel on the right hand side of the road. It will be appreciated that the detector is mounted on the left for travel on the left hand side of the road. For trucks, it may be desirable to provide a detector in front of each front wheel.

By mounting the detector or sensor assembly ahead of the wheel, interference from water or debris thrown out by the wheel is minimized. It is still possible that, in extremely wet conditions, and at certain speeds, the wheel can throw water forward so as to interfere with the operation of the detector assembly, but this condition cannot sensibly be avoided. Where this is a significant problem, it may prove preferable to mount the detector or sensor assembly more towards the centre, front of the vehicle.

It will be appreciated that the apparatus of the present invention is applicable to any moving vehicle, including cars, trucks, buses. It could also be used for tracked vehicles, such as trains. For trains, the problem of loss of control is not present. However, the operator of a train does need to know when icy conditions are present, so as to know when to drop sand or other material to assist in traction. For this use, it may be difficult to identify ice, as compared to the rail surface which is shiny in any event; on the other hand, rails have a consistent surface, and it may prove possible to identify a relatively small difference in reflectivity between a plain rail surface as opposed to an icy surface.

The apparatus can be provided as a number of separate elements. For example, the light source 18, lens 20, photodetector transistor 28 and lens 30 must necessarily be provided together and be mounted at some point on a vehicle directed at the road surface. The circuitry of FIG. 2 can either be provided together with the light source and detector, or separately. The apparatus would also include, as an element for mounting on a dashboard or other visible location, the warning diode 90, any other warning elements and at least some switch for turning the apparatus on and off. Conveniently, the circuitry of FIG. 2 is either provided with this dashboard assembly or with the light source and detector assembly.

We claim:

1. An apparatus for detecting the presence of ice or smooth packed snow on a road surface, the apparatus comprising:

a source of electromagnetic radiation for illuminating an area of the road surface;

a modulating circuit connected to the source for modulating the radiation provided by the source, the modulating circuit including means for generating a constant frequency drive signal at a frequency of at least 2 kHz, whereby the source is driven by the constant frequency drive signal to provide pulses at said constant frequency;

a detector for receiving radiation reflected back from the area of the road surface, to generate a detector signal; and a detection circuit connected to the detector for demodulating the detector signal, to generate an intermediate signal indicative of the reflectivity of the illuminated area, thereby indicating the presence of ice or smooth packed snow, the detection circuit comprising a filtering circuit for filtering out frequencies above and below the constant frequency, an intermediate amplifier connected to the output of the filtering circuit, a rectifying network means connected to the output of the intermediate amplifier, for generating a DC signal as an intermediate signal, and a comparator connected to the output of the rectifying network and having an input for a fixed level, the output of the comparator being an output signal indicative of the detected reflectivity.

2. An apparatus as claimed in claim 1, wherein the comparator includes a level adjustment potentiometer.

3. An apparatus as claimed in claim 2, wherein the output of the comparator is connected to a first warning device for providing a warning to a user, when reflectivity in excess of a set value is detected, indicative of the presence of ice.

4. An apparatus as claimed in claim 3, which includes a temperature sensitive means, a temperature operational amplifier having an input connected to the temperature sensitive means so as to be switched thereby, and a second warning device connected to the output of the temperature operational amplifier, the arrangement being such that the second warning device is activated when the temperature falls below a set level.

5. An apparatus as claimed in claim 4, wherein both the first and second warning devices comprise light sources.

6. An apparatus as claimed in claim 5, which include a third warning device, a respective third operational amplifier means for turning on the third warning device, the third operational amplifier means having an input connected to output of the comparator and the temperature operational amplifier so as to be switched in dependence upon those outputs, the arrangement being such that the third warning device is activated when both the first and second warning devices are actuated.

7. An apparatus as claimed in claim 6, wherein the third warning device comprises a light source.

8. An apparatus as claimed in claim 7, wherein each of the first, second or third warning devices comprise light emitting diode means connected in series with switching transistors, each of which is connected to a respective one of the comparator, the temperature operational amplifier and the third operational amplifier means, so as to be activated thereby.

9. An apparatus as claimed in claim 8, wherein the modulating circuit and the detection circuit are integral with one another and are provided with common connections to DC power lines, wherein the modulating circuit comprises an astable multivibrator having an output connected to the base of a current buffering transistor, wherein the source of radiation comprises a light emitting diode connected in series with the buffering transistor between the DC power supply lines.

10. An apparatus as claimed in claim 9, wherein the detector comprises a phototransistor connected between the DC power lines, and wherein the filtering network comprises a capacitor connected to the output of the transistor for filtering out low frequency components, and a filtering means having positive and negative inputs, which has a positive input connected to the filtering capacitor and a feedback loop between the output thereof and the negative input, which feedback loop includes a resistor and capacitor in parallel for filtering out higher frequency components.

11. An apparatus as claimed in claim 10, wherein the apparatus comprises a sensor assembly, including said source and said detector, adapted for mounting to a chassis of a vehicle, underneath the vehicle and directed at the ground, at a location in front of the wheels of the vehicle so as to be capable of examining a surface before it is disturbed by passage of the vehicle wheels, an indicator assembly adapted for mounting within an occupant compartment of the vehicle, the indicator assembly including the warning device, and connection means providing a connection between the indicator assembly and sensor assembly.

12. An apparatus for detecting the presence of ice or smooth packed snow on a road surface, the apparatus comprising: a source of electromagnetic radiation for illuminating an area of the road surface; a modulating circuit connected to the source for modulating the radiation provided by the source, whereby the source is driven to provide pulses at a known frequency; a detector for receiving radiation reflected back from the area of the road surface, to generate a detector signal; and a detection circuit connected to the detector for demodulating the detector signal, to generate an intermediate signal indicative of the reflectivity of the illuminated area, thereby indicating the presence of ice or smooth packed snow, and at least one warning device connected to the detection circuit, wherein the apparatus comprises a sensor assembly, including said source and said detector, adapted for mounting to a chassis of a vehicle, underneath the vehicle and directed at the ground, at a location in front of the wheels of the vehicle so as to be capable of examining a surface before it is disturbed by passage of the vehicle wheels, an indicator assembly adapted for mounting within an occupant compartment of the vehicle, the indicator assembly including the warning device, and connection means providing a connection between the indicator assembly and sensor assembly.

13. An apparatus as claimed in claim 12, wherein the modulating circuit including means for generating a constant frequency drive signal whereby the source is driven by the constant frequency drive signal to provide pulses at said constant frequency, and the detection circuit includes a filtering circuit for filtering out frequencies above and below the constant frequency.

14. An apparatus as claimed in claim 13, wherein the detection circuit further includes an intermediate amplifier connected to the output of the filtering circuit, a rectifying network connected to the output of the intermediate amplifier, for generating a DC signal as an intermediate signal, and a comparator connected to the output of the rectifying network and having an input for a fixed level, the output of the comparator being an output signal indicative of the detected reflectivity, the comparator including a level adjustment potentiometer.

15. An apparatus as claimed in claim 14, which includes: a first warning device for providing a warning to a user, when reflectivity in excess of a set value is detected, indicative of the presence of ice, the output of the comparator being connected to said first warning device; a temperature sensitive means; a temperature operational amplifier having an input connected to the temperature sensitive means so as to be switched thereby; and a second warning device connected to the output of the temperature operational amplifier, the arrangement being such that the second warning device is activated when the temperature falls below a set level.

16. An apparatus as claimed in claim 15, which include a third warning device, a respective third operational amplifier means for turning on the third warning device, the third operational amplifier means having an input connected to output of the comparator and the temperature operational amplifier so as to be switched in dependence upon those outputs, the arrangement being such that the third warning device is activated when both the first and second warning devices are activated.

17. A method of detecting the presence of ice or smooth packed snow on a road surface, the method comprising the steps of:

(1) providing a sensor assembly, including illumination and detection means mounted on a wheeled vehicle ahead of the wheels thereof so as to examine a surface before disturbance by the wheels, and an indicator assembly within an occupant compartment of the vehicle including indicating means for indicating the condition of a surface on which the vehicle is travelling;

(2) illuminating an area of a road surface with electromagnetic radiation from the illumination means which is pulsed at a frequency of at least 2 kHz;

(3) detecting radiation reflecting back from the illuminated area of the road surface with the detection means, to generate a detection signal; and (4) demodulating the detected signal, to filter out unwanted signals, to generate an intermediate signal indicative of the reflectivity of the road surface, thereby indicating the presence of ice or smooth packed snow.

18. A method as claimed in claim 17, wherein the fixed frequency is modulated at a known frequency in the range of 8 kHz to 200 kHz.

19. A method as claimed in claim 17, wherein the electromagnetic radiation comprises infrared radiation with a wavelength of approximately 900 nm.

20. A method as claimed in claim 19, which includes providing a warning indication when reflectivity in excess of a set level is detected, indicative of a slippery surface.

21. A method as claimed in claim 20, which includes detecting ambient temperature and providing an indication when the temperature falls below a set temperature indicative of freezing conditions.

* * * * *